US011265842B2

(12) United States Patent
Smith et al.

(10) Patent No.: US 11,265,842 B2
(45) Date of Patent: Mar. 1, 2022

(54) WIRELESS STATION RANGING USING CHANNEL STATE

(71) Applicant: Cisco Technology, Inc., San Jose, CA (US)

(72) Inventors: Malcolm M. Smith, Richardson, TX (US); Xiaoqing Zhu, Austin, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 16/812,427

(22) Filed: Mar. 9, 2020

(65) Prior Publication Data
US 2021/0282108 A1 Sep. 9, 2021

(51) Int. Cl.
| | | |
|---|---|---|
| *H04W 64/00* | (2009.01) | |
| *H04W 24/10* | (2009.01) | |
| *H04B 7/06* | (2006.01) | |
| *H04B 7/08* | (2006.01) | |
| *G01S 5/02* | (2010.01) | |

(52) U.S. Cl.
CPC ......... *H04W 64/003* (2013.01); *G01S 5/0284* (2013.01); *H04B 7/0626* (2013.01); *H04B 7/086* (2013.01); *H04W 24/10* (2013.01)

(58) Field of Classification Search
CPC ........ G01S 5/14; G01S 13/765; G01S 13/878; G01S 5/0236; G01S 5/0284; H04W 64/00; H04W 4/02; H04W 4/023; H04W 84/12; H04W 36/30; H04W 48/16; H04W 48/20; H04W 4/025; H04W 60/04; H04W 64/003; H04W 8/14
See application file for complete search history.

(56) References Cited

U.S. PATENT DOCUMENTS

| | | | |
|---|---|---|---|
| 9,730,179 B2* | 8/2017 | Aldana | H04W 24/10 |
| 10,064,154 B2 | 8/2018 | Banin et al. | |
| 10,104,493 B2 | 10/2018 | Wang et al. | |
| 10,219,241 B2 | 2/2019 | Kakani et al. | |
| 2016/0366548 A1* | 12/2016 | Wang | H04W 4/023 |
| 2017/0171833 A1 | 6/2017 | Vamaraju et al. | |
| 2017/0280414 A1* | 9/2017 | Gidvani | G01S 11/02 |

(Continued)

FOREIGN PATENT DOCUMENTS

| | | |
|---|---|---|
| GN | 110199486 A | 9/2019 |
| WO | 2018102247 A2 | 6/2018 |

OTHER PUBLICATIONS

Rea et al., "Smartphone Positioning with Radio Measurements from a Single WiFi Access Point," Association for Computing Machinery, 2019, 7 pages.

(Continued)

*Primary Examiner* — Liton Miah
(74) *Attorney, Agent, or Firm* — Patterson + Sheridan, LLP

(57) ABSTRACT

Techniques for determining a range between a wireless station (STA) and a wireless access point (AP) using channel state information are described. An AP determines channel state information corresponding to an STA. The AP determines, based on the channel state information, one or more fine timing measurement (FTM) parameters. A plurality of FTM messages are transmitted between the AP and the STA, based on the one or more FTM parameters. The STA is configured to determine an estimated range to the AP based on the plurality of FTM messages.

20 Claims, 8 Drawing Sheets

(56) References Cited

U.S. PATENT DOCUMENTS

| | | | | |
|---|---|---|---|---|
| 2018/0184392 | A1* | 6/2018 | Prechner | H04W 64/00 |
| 2019/0116627 | A1* | 4/2019 | Min | H04W 64/00 |
| 2019/0141556 | A1* | 5/2019 | Kasher | H04W 16/28 |
| 2019/0191323 | A1* | 6/2019 | Venkatesan | H04W 74/006 |
| 2019/0306825 | A1 | 10/2019 | Lindskog et al. | |
| 2020/0068520 | A1* | 2/2020 | Marri Sridhar | G01S 13/765 |
| 2020/0314220 | A1* | 10/2020 | Segev | H04L 69/28 |
| 2021/0120405 | A1* | 4/2021 | Kim | H04L 27/2613 |

OTHER PUBLICATIONS

Ibrahim et al., "Verification: Accuracy Evaluation of WiFi Fine Time Measurements on an Open Platform," 2018, Association for Computing Machinery, 11 pages.

PCT Notification of Transmittal of The International Search Report and The Written Opinion of tThe International Searching Authority, or The Declaration for Application PCT/US2021/070254 dated Jun. 23, 2021.

\* cited by examiner

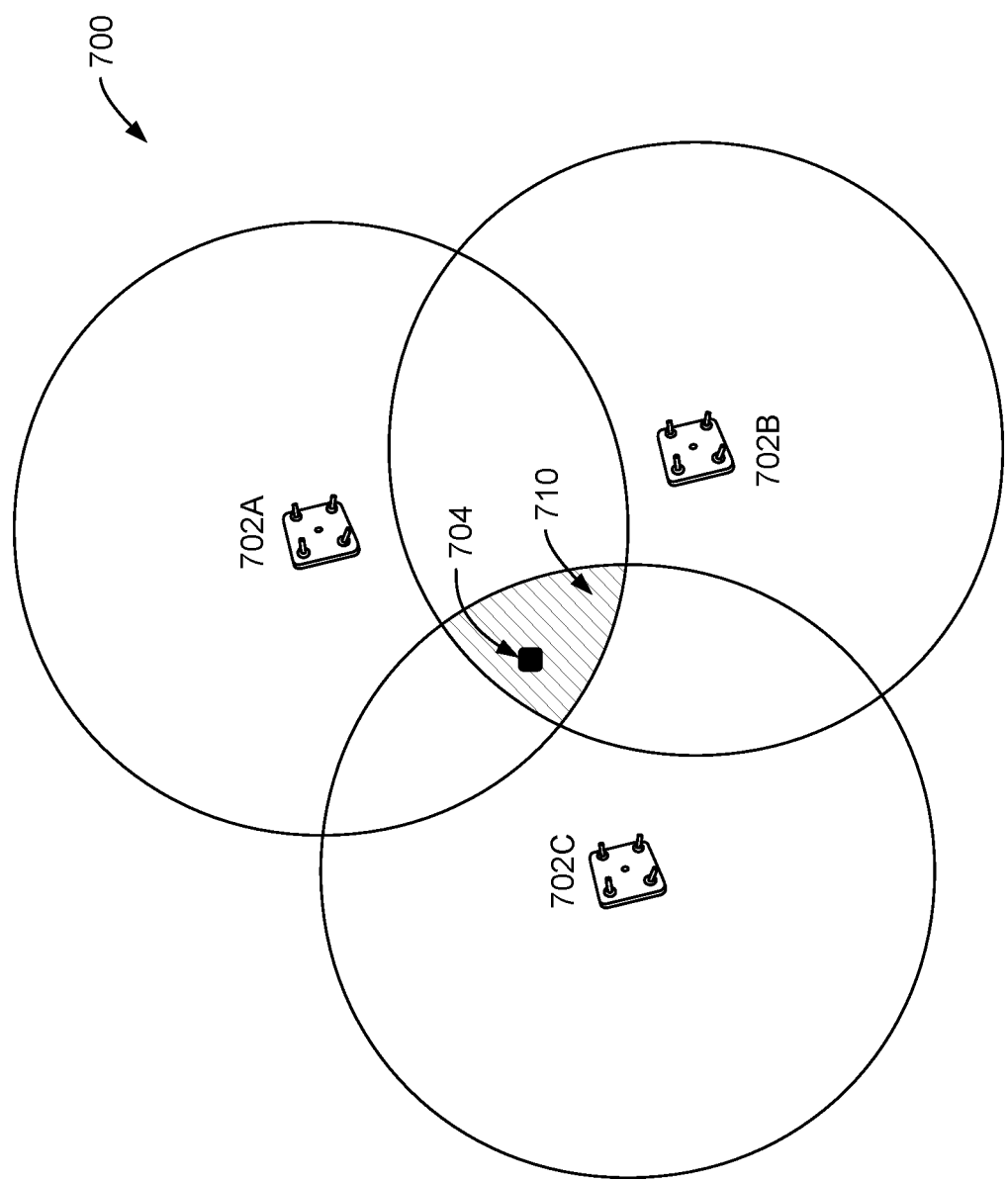

WIRELESS STATION RANGING USING CHANNEL STATE

TECHNICAL FIELD

Embodiments presented in this disclosure generally relate to wireless communications. More specifically, one or more embodiments disclosed herein relate to determining a range between a wireless station and a wireless access point using channel state information.

BACKGROUND

Fine Timing Measurement (FTM) techniques can allow an initiating wireless station (STA) to perform ranging against a responding STA, and compute the initiating STA's position. The initiating STA can be any suitable wireless device, including a laptop computer, a smartphone, a tablet, another suitable user device, or a wireless network infrastructure device. The responding STA can also be any suitable wireless device, but in an embodiment the responding STA is a wireless access point (AP) which participates in the ranging process by time-stamping wireless messages as needed and negotiating range parameters, including burst size, burst frequency, and others. For example, the AP can time-stamp physical layer convergence protocol (PLCP) protocol data units (PPDUs).

The initiating STA, however, does not have access to the AP's knowledge of the wireless network structure and radio frequency (RF) conditions. This can require the initiating STA to seek an excessive number of ranging requests with the AP. For example, the number of ranging requests to be used for all initiating STAs, regardless of environment, can be determined during laboratory testing in order to ensure that ranging is sufficiently accurate in the vast majority (e.g., 99.9%) of envisioned deployments (e.g., sufficient requests for accurate ranging in the most stringent environments). But this is likely to result in unnecessary messaging, because most initiating STAs are actually located in less stringent environments and will not actually need this many requests to determine the range with the AP. This excess ranging, well beyond the number of requests actually needed, in most deployments, to characterize the environment and determine the range from the initiating STA to the AP, is undesirable. It can waste scarce WiFi air-time, cause unplanned contention and reduce the quality-of-experience (QoE) for users. Further, the ranging can be inaccurate, especially in reflective environments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 7A-B illustrate location estimation for a wireless STA among multiple APs, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

OVERVIEW

Figure 1:
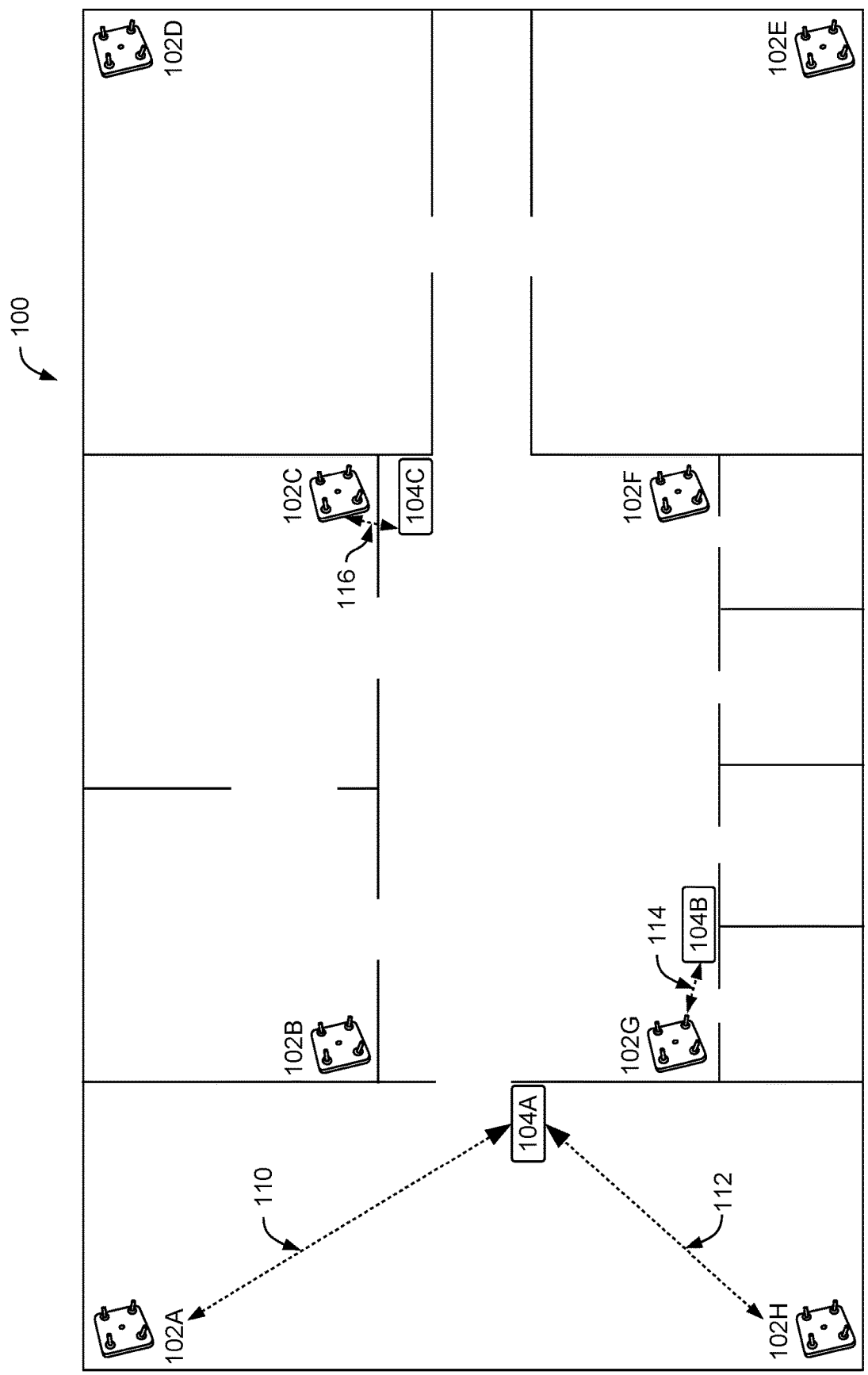
FIG. 1 illustrates determining a range of an STA from an AP, according to one embodiment.

Embodiments described herein include a method. The method includes determining channel state information at a wireless AP corresponding to a STA. The method further includes determining, at the AP based on the channel state information, one or more FTM parameters. The method further includes transmitting, based on the one or more FTM parameters, a plurality of FTM messages between the AP and the STA, wherein the STA is configured to determine an estimated range to the AP based on the plurality of FTM messages.

Embodiments further include a wireless AP, including a processor and a memory storing a program, which, when executed on the processor, performs an operation. The operation includes determining channel state information corresponding to a wireless STA. The operation further includes determining, based on the channel state information, one or more FTM parameters. The operation further includes transmitting, based on the one or more FTM parameters, a plurality of FTM messages between the AP and the STA, wherein the STA is configured to determine an estimated range to the AP based on the plurality of FTM messages.

Embodiments further include a wireless STA, including a processor and a memory storing a program, which, when executed on the processor, performs an operation. The operation includes receiving one or more FTM parameters from a wireless AP, wherein the AP is configured to determine the one or more FTM parameters based on channel state information corresponding to the STA. The operation further includes transmitting, based on the one or more FTM parameters, a plurality of FTM messages between the STA and the AP. The operation further includes determining an estimated range to the AP based on the plurality of FTM messages.

EXAMPLE EMBODIMENTS

In an embodiment, ranging between an arbitrary wireless STA and an AP can be improved by using channel quality observations to determine FTM ranging parameters and improve FTM calculations for another arbitrary STA. For example, an AP can use Angle-of-Arrival (AoA) antennas to determine general channel quality characteristics of a set of arbitrary STA. This channel quality information can be used to negotiate FTM parameters, resulting in improved ranging from the STA to the AP while avoiding unnecessary messaging. FTM is merely one example of suitable range finding techniques, and other techniques can be used. Further, the channel quality information can be used to improve the FTM calculations.

In an embodiment, an AP can include AoA analysis features, which can be used to capture channel state information (CSI) across n antennas (e.g., 32 antennas). The AP can compare observed CSI for a given antenna communicating with an STA against a reference value, and estimate the relative position of the STA to the AP. This can allow the AP to estimate the location of a remote STA, but does not assist the STA in measuring its own relative position to the AP because the STA does not have access to the channel state information.

CSI, however, can provide information about the deployment environment of the AP. For example, CSI can be used to distinguish an AP in a high ceilinged open space with good line of sight (LOS) to STAs from an AP in a lower ceilinged cubicle-rich environment with limited or non LOS (NLOS). CSI can also be used to identify the stability of the wireless channel as experienced by the STA (e.g. stationary vs. volatile). In an embodiment, by comparing consecutively measured CSIs and measuring the temporal correlation of the CSI trace for a given client, an AP can identify that the location of a given STA either remains unchanged (stationary) or is in motion (volatile).

In an embodiment, this CSI information can be used to improve ranging using FTM or another suitable range finding technique. For example, where the STA is not moving a single, longer, burst of FTM messaging may be sufficient, without requiring multiple bursts. As another example, where the STA is moving, a series of shorter bursts of FTM messaging may be more effective to capture the peaks and valleys of the volatile mobile channel.

Further, in an embodiment, the CSI profile over subcarriers for a given STA can indicate whether the wireless propagation environment includes multiple paths (e.g., reflected in the multiple peaks and valleys of the CSI in the frequency domain) or is dominated by a direct LOS path (e.g., reflected in a relatively flat CSI profile in the frequency domain). This can be used to further improve ranging. For example, as discussed above, CSI can be used to distinguish an AP with direct LOS to an STA from an AP with NLOS to the STA. Where the AP estimates direct LOS to the STA, a small number of short FTM bursts can be used but where an AP estimates NLOS a larger number of short FTM bursts can be used.

Where an AP estimates multiple paths (e.g., reflection), the STA may, by using FTM, over-estimate the distance to the AP because signals will take longer to propagate between the STA and the AP due to the reflection. In this example, the stochasticity of the signal can be used to estimate the degree of multi-path delay spread and improve the range estimation from FTM (e.g., by revising the timestamp values included in the FTM messaging to reflect the multi-path delay spread). This provides for more accurate ranging by the STA.

FIG. 1 illustrates determining a range of an STA from an AP, according to one embodiment. An indoor environment 100 includes a number of APs 102A-H and a number of STAs 104A-C. Each STA 104A-C can determine its range from the APs using FTM techniques (e.g., by exchanging timestamped messages). Example FTM techniques are discussed in more detail with regard to FIG. 2. For example, the STA 104A can use FTM techniques to estimate the length of the distance 110 between the STA 104A and the AP 102A.

The STA 104A can similarly use FTM techniques to estimate the distance 112 to the AP 102H. The STA 104B can use FTM techniques to estimate the distance 114 to the AP 102G. The STA 104C can use FTM techniques to estimate the distance 116 to the AP 102C. This positioning information can be used by the STAs for a number of management purposes, including selecting an AP for connection and configuring a variety of radio transmission and other parameter. The positioning information can also be used for numerous application purposes, including augmented reality, social networking, health care monitoring, inventory control, etc.

Figure 2:
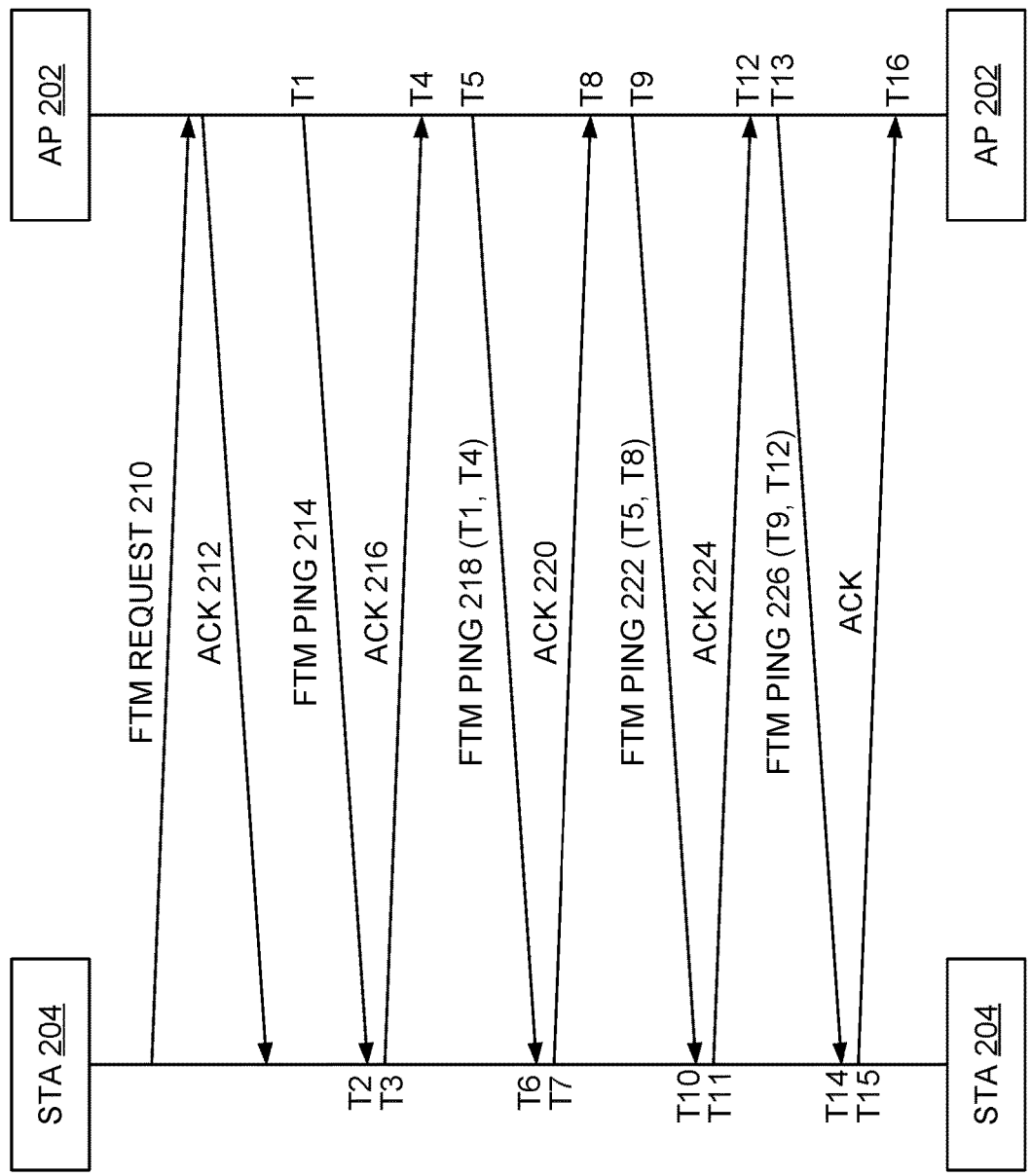
FIG. 2 is a messaging diagram illustrating FTM techniques, according to one embodiment.

FIG. 2 is a messaging diagram illustrating FTM techniques, according to one embodiment. As noted above, FTM is merely one example of a suitable range finding technique and other techniques can be used in place of, or in addition to, FTM. In an embodiment, FTM is initiated by an STA 204 to determine a distance from an AP 202. The clock of the STA 204 and the AP 202 are not synchronized, and so the STA and AP must exchange a series of timestamps to identify the time taken for a wireless signal (e.g., a WiFi signal) to travel between the STA 204 and the AP 202. This time can be used to estimate the distance between the STA 204 and the AP 202 because the time taken for the signal to travel the distance is proportional to the distance (e.g., based on the speed of light).

The STA 204 transmits an FTM request 210 to the AP 202. The AP 202 responds with an Ack 212 (e.g., an acknowledgment). In an embodiment, the Ack 212 includes FTM parameters determined by the AP 202. These parameters are discussed further below. Further, in an embodiment, the STA 204 and AP 202 can undertake a negotiation for the FTM parameters, exchanging messages identifying parameters to use.

At time T1, the AP 202 transmits an FTM ping 214 to the STA 204. The STA 204 receives the FTM ping 214 at time T2. At time T3, the STA 204 transmits an Ack 216. The AP 202 then, at time T5, transmits an FTM ping 218 to the STA 204. This FTM ping 218 includes the timestamps T1 and T4 identifying the times at which the AP 202 transmitted the FTM ping 214 and received the Ack 216.

The STA 204 receives the FTM ping 218 at time T6. The STA 204 can then use the timestamps T1, T2, T3, and T4 (T1 and T4 received from the AP 202, T2 and T3 recorded locally by the STA) to compute the round trip time for message transmission between the STA 204 and the AP 202. In an embodiment, this can be used to estimate the distance between the STA 204 and the AP 202 using the equation: $2*distance=((T4-T1)-(T3-T2))*c$. In this equation, c is the speed of light, (T4−T1) computes the total round trip time, and (T3−T2) removes the turnaround time at the STA between receiving the FTM ping 214 and transmitting the Ack 216.

In an embodiment, however, the round trip time measurements may not be sufficiently accurate, because of potential interference, motion of the STA, measurement error, etc. Therefore repeated measurements can be used to improve the accuracy of the distance estimation.

As illustrated in FIG. 2, two more round-trips can be used to improve accuracy: FTM Ping 218 and Ack 220, and FTM Ping 222 and Ack 224. In an embodiment, the final FTM Ping 226 provides the timestamps T9 and T12 to the STA 204 to allow calculation of the round trip time between the FTM Ping 222 and the Ack 224, but the travel time of the FTM Ping 226 itself is not used for distance estimation. The two additional round trips illustrated in FIG. 2 are merely for illustration. More, or fewer, round trips can be used. Further, many different parameters can be configured, including the time between round trips, the number of round trips in a burst, etc.

Figure 3:
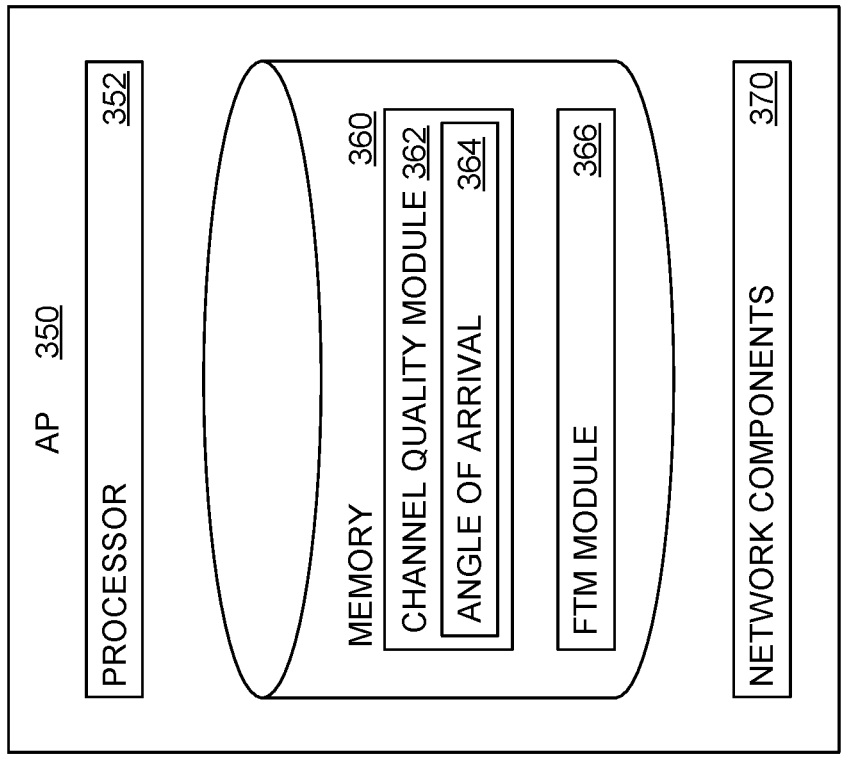
FIG. 3 is a block diagram illustrating a wireless STA and an AP, according to one embodiment.
Figure 3:
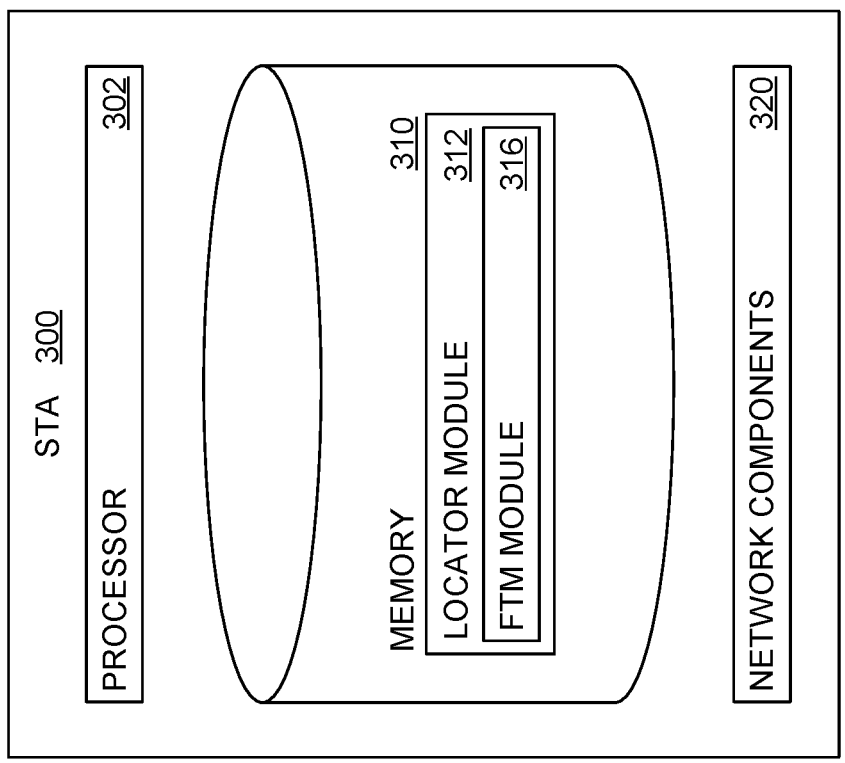

FIG. 3 is a block diagram illustrating a wireless STA 300 and an AP 350, according to one embodiment. The STA 300 includes a processor 302, a memory 310, and network components 320. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like.

The network components 320 include the components necessary for the STA 300 to interface with a wireless communication network, as discussed above in relation to FIGS. 1-2. For example, the network components 320 can include WiFi or cellular network interface components and associated software.

Although the memory 310 is shown as a single entity, the memory 310 may include one or more memory devices having blocks of memory associated with physical addresses, such as random access memory (RAM), read only memory (ROM), flash memory, or other types of volatile and/or non-volatile memory. The memory 310 generally includes program code for performing various functions related to use of the STA 300. The program code is generally described as various functional "applications" or "modules" within the memory 310, although alternate implementations may have different functions and/or combinations of functions.

Within the memory 310, a locator module 312 includes an FTM module 316. In an embodiment, the FTM module 316 facilitates FTM range finding, as discussed above in relation to FIG. 2. FTM is merely one example of a suitable range finding technique, and other techniques can be used. The locator module 312 facilitates identifying the range of the STA 300 from an AP (e.g., the AP 350) and facilitates identifying the location of the STA 300 using the range information (e.g., in an indoor environment). This is discussed further with regard to FIG. 4 and after.

The AP 350 includes a processor 352, a memory 360, and network components 370. The processor 352 generally retrieves and executes programming instructions stored in the memory 360. The processor 352 is included to be representative of a single central processing unit (CPU), multiple CPUs, a single CPU having multiple processing cores, graphics processing units (GPUs) having multiple execution paths, and the like.

The network components 370 include the components necessary for the AP 350 to interface with a wireless communication network, as discussed above in relation to FIGS. 1-2. For example, the network components 370 can include WiFi or cellular network interface components and associated software.

Although the memory 360 is shown as a single entity, the memory 360 may include one or more memory devices having blocks of memory associated with physical addresses, such as random access memory (RAM), read only memory (ROM), flash memory, or other types of volatile and/or non-volatile memory. The memory 360 generally includes program code for performing various functions related to use of the AP 350. The program code is generally described as various functional "applications" or "modules" within the memory 360, although alternate implementations may have different functions and/or combinations of functions.

Within the memory 360, the channel quality module 362 uses an angle of arrival module 364 (e.g., using a number of angle of arrival antennas) to identify channel quality information. The FTM module 366 facilitates use of FTM techniques to allow an STA (e.g., the STA 300) to identify its range from the AP 350. This is discussed further in relation to FIG. 4 and after.

Figure 4:
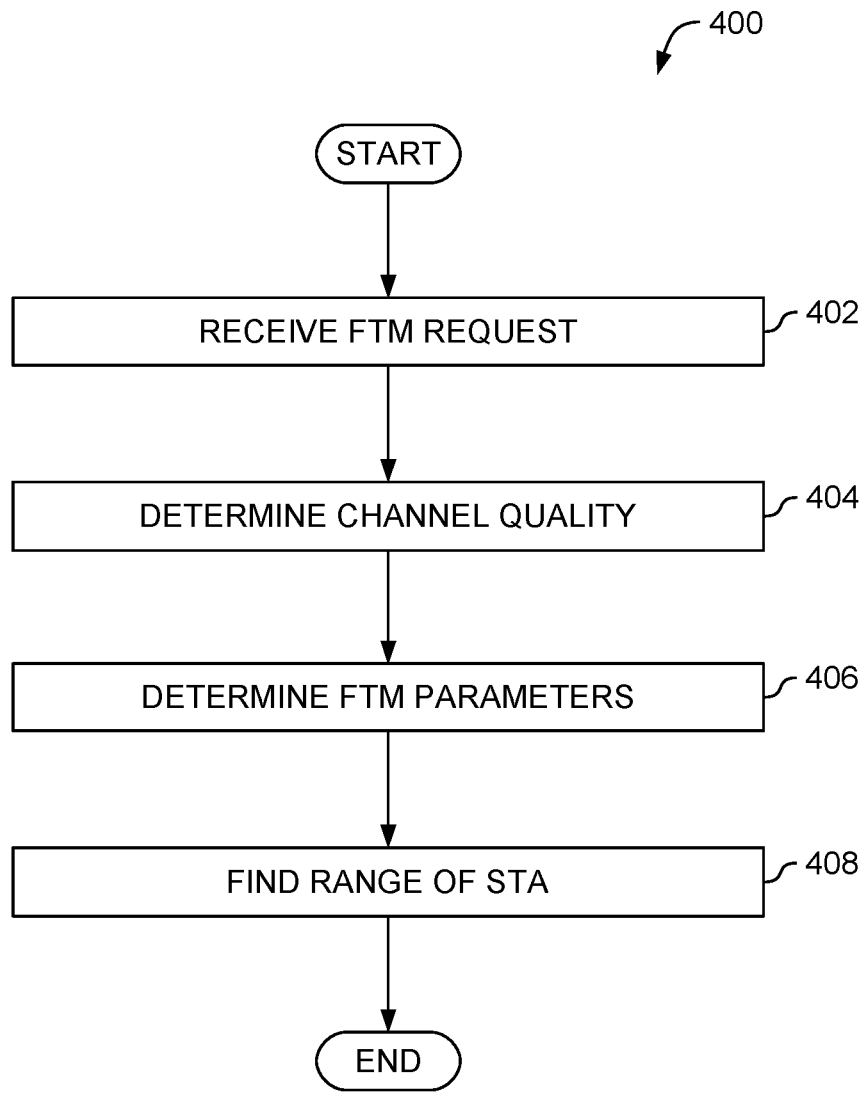
FIG. 4 is a flowchart for ranging between an STA and an AP using FTM and channel quality, according to an embodiment.

FIG. 4 is a flowchart 400 illustrating ranging between an STA and an AP using FTM and channel quality, according to an embodiment. At block 402 an AP (e.g., the AP 350 illustrated in FIG. 3) receives an FTM request (e.g., the FTM request 210 illustrated in FIG. 2) from an STA (e.g., the STA 300 illustrated in FIG. 3). As discussed above, FTM is merely one suitable technique for ranging between an STA and an AP, and other suitable techniques can be used. As discussed above, FTM generally works well in a laboratory environment but, in some circumstances, may have flaws in practice. For example, FTM may be inaccurate or may waste bandwidth in reflective or obstacle filled environments. As another example, non-optimal access points may respond to FTM messages from an STA, causing further problems. In an embodiment, channel quality information and other techniques can be used to improve FTM.

At block 404, a channel quality module (e.g., the channel quality module 362 illustrated in FIG. 3) determines channel quality for the channel with the STA. In an embodiment, two parameters can be used to characterize the channel quality: stability (i.e., coherence) and delay spread (i.e., power-delay-profile). In an embodiment, stability measures the coherence of the channel and can be used to determine a variety of FTM parameters, including how frequently FTM bursts should be transmitted for accurate ranging from the STA to the AP. In an embodiment, delay spread can be used to determine additional FTM parameters, including how many FTM samples to include in an FTM burst, for accurate ranging from the STA to the AP. This is discussed further with regard to FIG. 5, below.

At block 406, an FTM module (e.g., the FTM module 366 in the AP 350 illustrated in FIG. 3) determines FTM parameters based on the channel quality information. In an embodiment, the FTM module can determine FTM channel sounding parameters based on the channel quality information. For example, the FTM module can determine the number of FTM bursts, the duration, FTM frames per burst, and other suitable parameters based on the channel quality information.

For example, a channel with a relatively high delay spread (e.g. 100 ns) could require a larger number of bursts to achieve high location accuracy (e.g., the STA may be NLOS to the AP). By contrast, a channel with a relatively low delay spread (e.g., 5 ns) could require fewer bursts (e.g., the STA may be in LOS to the AP). Similarly, a channel that is stationary with a relatively high 200 ms coherence time (Tc) can be characterized by a longer burst period (e.g. $1/5s$) whereas a more volatile channel could use a shorter burst period (e.g. 10 ms) to force characterization while the channel is likely to stable. In an embodiment, determining the FTM parameters can be a negotiation between an AP and an STA. For example, an AP can propose initial parameters, and an STA can either agree to the parameters or proposed modified parameters.

At block 408, the FTM module uses the FTM parameters to find the range of the STA to the AP. For example, the FTM module can use the number of bursts, duration, FTM frames per burst, and other parameters to transmit FTM messages in a suitable fashion (e.g., as illustrated in FIG. 2) to determine the range of the STA to the AP. In an embodiment, this greatly improves the bandwidth usage and the number of message transmissions, while also improving the accuracy of the ranging.

In an embodiment, the channel quality determination (e.g., as discussed above with regard to block 404 and below with regard to FIG. 5) occurs in real-time along with the FTM techniques. Further, the FTM module can monitor channel quality over time and modify FTM parameters throughout the FTM process. In an embodiment, the AP can identify changes in channel quality over time and can modify FTM parameters based on the changes. For example, the AP can determine that an obstacle (e.g., a person) has come between the STA and the AP. The AP can therefore modify the FTM parameters to improve the FTM process (e.g., providing for shorter bursts with longer wait times between bursts).

In an embodiment, the FTM module can further track FTM measurements over time, and discard FTM messages that appear to be inaccurate or outliers. This can be done by an FTM module in the AP (e.g., the FTM module 366 illustrated in FIG. 3) or in an STA (e.g., the FTM module 316 illustrated in FIG. 3). In an embodiment, this can be done without using channel quality information. Alternatively, inaccurate or outlier messages can be identified using channel quality information. For example, a longer than expected travel time for an FTM message may be accurate if the channel quality reflects an obstacle appearing between the STA and the AP. But a longer than expected travel time for an FTM message may be inaccurate if the channel quality reflects a high quality channel (e.g., clear LOS) between the STA and the AP.

Figure 5:
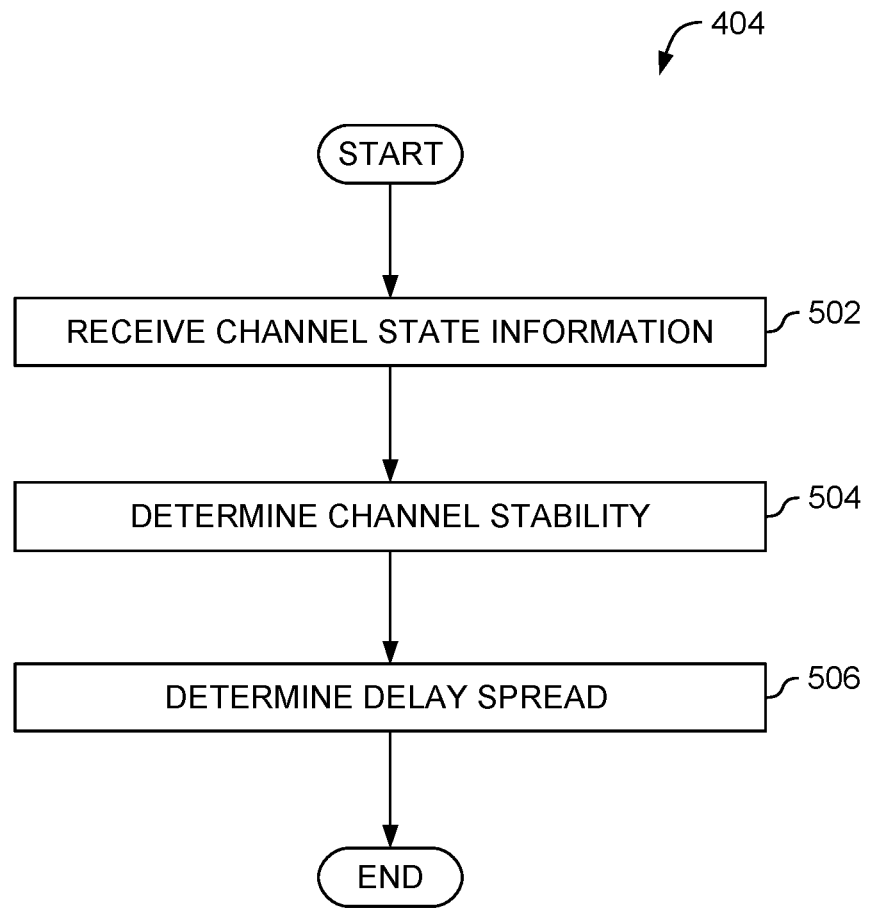
FIG. 5 is a flowchart for determining channel quality, according to one embodiment.

FIG. 5 is a flowchart for determining channel quality, according to one embodiment. In an embodiment, FIG. 5 corresponds with block 404 illustrated in FIG. 4. At block 502, a channel quality module (e.g., the channel quality module 362 in the AP 350 illustrated in FIG. 3) receives channel state information.

In an embodiment, existing channel quality solutions can be used. For example, many APs uses an antenna array on the AP (e.g., 32 antennas) to determine AoA information and estimate channel quality. FTM (and similar techniques) uses time of arrival (TOA) information (e.g., the rising edge of a PPDU preamble) for ranging. This means that channel quality information (e.g., channel-state-information (CSI)) from any Orthogonal Frequency Division Muliplexing (OFDM) PPDU preamble received by the antenna array can be used, for a given 20 MHz channel. In an embodiment, channel quality information determined by the AoA antenna is used, but AoA information itself is not used. Use of AoA antenna is merely one example of a technique to determine channel quality, and other techniques can be used. Further, AoA antenna techniques can be used to further refine the channel estimate since this allows for many distinct, time-separated, but spatially related, channel samples. For example, 32 samples (e.g., 8 samples of 4 elements each 4 ms) can be used.

At block 504, the channel quality module determines channel stability. As discussed above, channel stability is one parameter of channel quality that can be used to determine FTM parameters. In an embodiment, channel stability (i.e., coherence) can be determined based on measuring phase and/or amplitude of a signal over time. A channel in which phase and/or amplitude varies significantly is less coherent than a channel in which phase and/or amplitude remain stable.

For example, assume an AP includes 32 antennas for determining AoA information. Each set of 4 coincident samples can be treated as a channel sample by, for example, averaging the samples. This can be repeated (i.e. sampling different sets of 4 antennas until all 32 are sampled) until an evolution of the channel coherence (Tc) can be formed. In an embodiment, this requires a sufficient number of repetitions to cover suitable coherence times. The channel quality module can estimate the time over which the $T_c$ is relatively stable. This can distinguish STAs that are mobile from STAs that are stationary, but include non-motion related distortions. Further, FTM transmissions with relatively long intervals can be discarded as unlikely to be accurate, and only data burst sequences selected. This can improve accuracy.

At block 506, the channel quality module determines delay spread. Delay spread is another parameter of channel quality that can be used to determine FTM parameters. In an embodiment, this can be determined by estimating individual path delays for the channel. For example, long training field (LTF) samples (e.g., 32 LTF samples) can be used with AoA antennas to identify shifted peaks in sub-carriers. This can be used to estimate individual path delays for the sub-carriers and determine delay spread for the channel.

Figure 6:
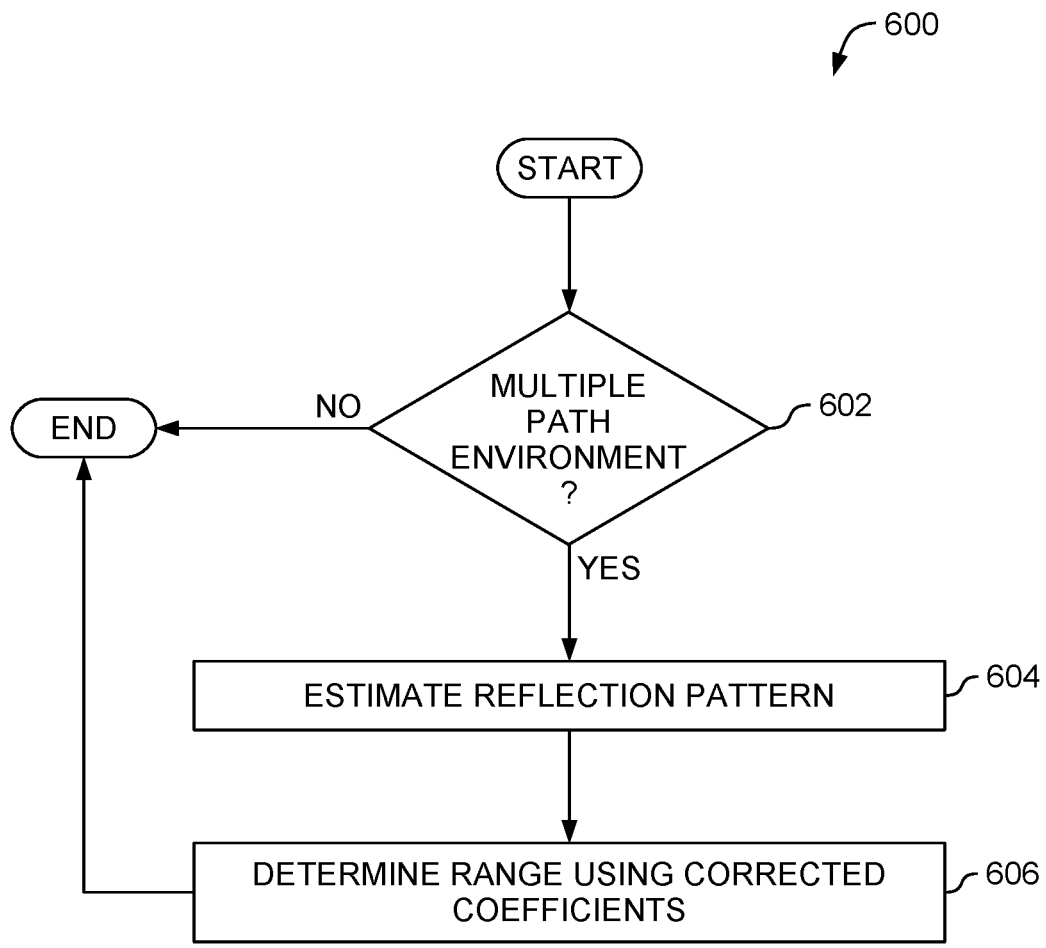
FIG. 6 is a flowchart for improved ranging between an STA and an AP in a reflective environment, according to one embodiment.

FIG. 6 is a flowchart 600 illustrating improved ranging between an STA and an AP in a reflective environment, according to one embodiment. At block 602, a channel quality module (e.g., the channel quality module 362 in the AP 350 illustrated in FIG. 3) determines whether the AP and STA are in a multiple path environment. As discussed above, the CSI profile over subcarriers for a given STA can indicate whether the wireless propagation environment includes multiple paths (e.g., reflected in the multiple peaks and valleys of the CSI in the frequency domain) or is dominated by a direct LOS path (e.g., reflected in a relatively flat CSI profile in the frequency domain). If the wireless propagation environment between the AP and the STA includes multiple paths, the flow proceeds to block 604. If not, the flow ends.

At block 604, the channel quality module estimates the reflection pattern. In an embodiment, the channel quality module can use the stochasticity of the signal to estimate the degree of multi-path delay spread between the AP and the STA and improve the range estimation from FTM (e.g., by revising the timestamp values included in the FTM messaging to reflect the multi-path delay spread). This can improve ranging using FTM because, where an AP estimates multiple paths the STA may, by using FTM, over-estimate the distance to the AP because signals will take longer to propagate between the STA and the AP due to the reflection.

At block 606, an FTM module (e.g., the FTM module 366 in the AP 350 illustrated in FIG. 3) determines the range between the STA and the AP, using the reflection pattern. For example, the FTM module 366 can instruct the STA (e.g., the locator module 312 in the STA 300 illustrated in FIG. 3) to apply one or more coefficients to the timestamp values (e.g., the timestamps illustrated in FIG. 2) to improve the accuracy of the distance estimation in the reflective environment. That is, the locator module can apply coefficients to modify the timestamp values so that the FTM calculations take into account the reflective paths and improve the accuracy of the range estimation.

FIG. 7A illustrates location estimation for a wireless STA 704 among multiple APs 702A-C in an environment 700, according to one embodiment. In an embodiment, an STA 704 is determining its location relative to the APs 702A-C. Further, in an embodiment, the environment 700 is reflective, creating multiple transmission paths between the STA 704 and the APs 702A-C. Assuming the STA 704 and the APs 702A-C do not implement the improved FTM techniques illustrated in FIG. 6, the location estimation can only determine that the STA 704 is within the region 710. This is because the environment 700 is reflective, and so the FTM techniques between the STA 704 and the APs 702A-C are therefore less accurate.

Figure 7B:
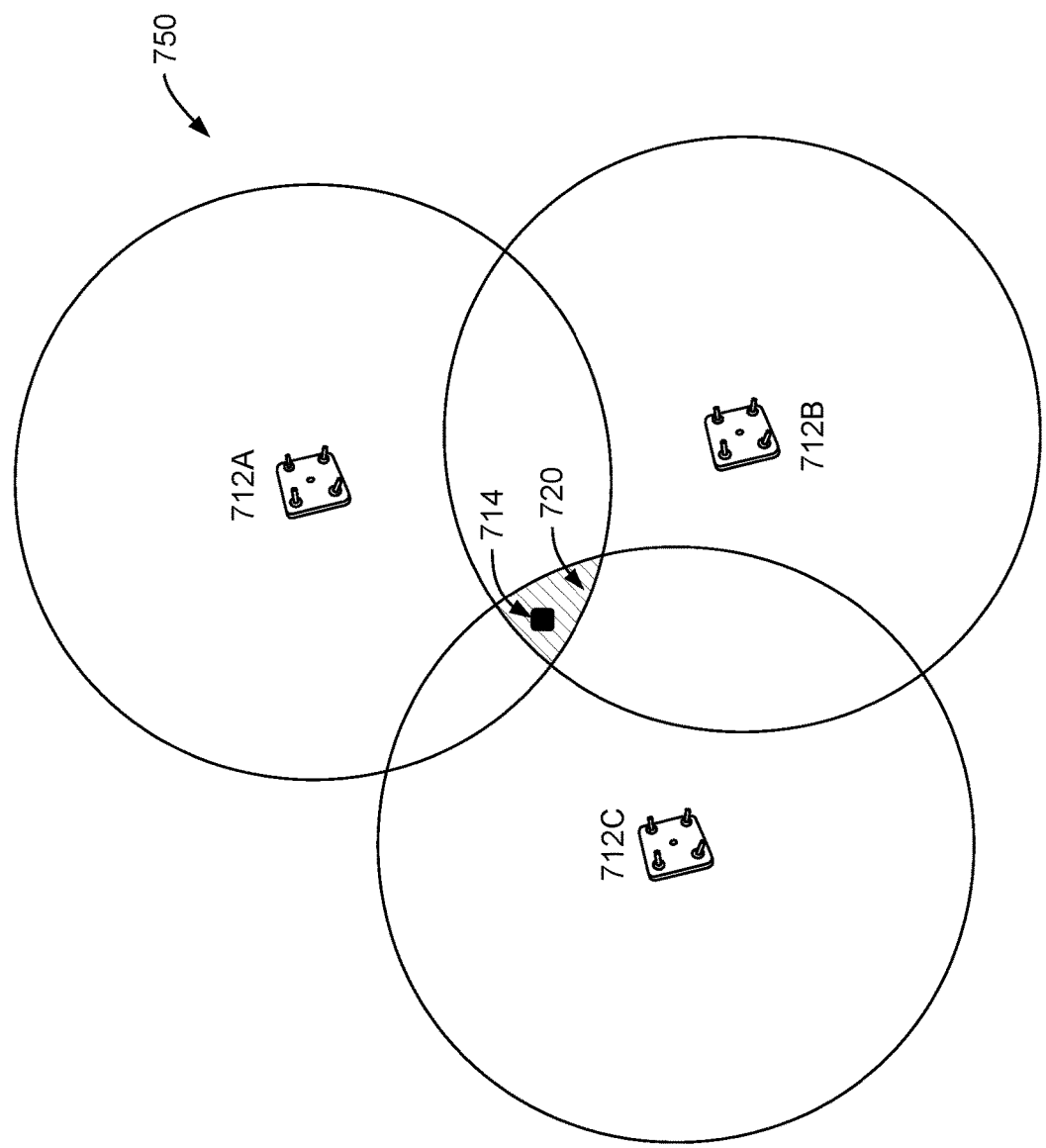

FIG. 7B illustrates location estimation for a wireless STA 714 among multiple APs 712A-C in an environment 750, according to one embodiment. In an embodiment, the STA 714 is determining its location relative to the APs 712A-C. Further, in an embodiment, the environment 750 is again reflective, creating multiple transmission paths between the STA 714 and the APs 712A-C. The STA 714 and the APs 712A-C, however, implement the improved FTM techniques for reflective environments illustrated in FIG. 6. Therefore, the location of the STA 714 can be narrowed to the region 720 (smaller than the region 710 illustrated in FIG. 7A). This is because the improved FTM techniques illustrated in FIG. 6 make the FTM techniques between the STA 714 and the APs 712A-C more accurate in the reflective environment 750.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    determining channel state information at a wireless access point (AP) corresponding to a wireless station (STA), comprising:
        determining, using a plurality of angle of arrival (AoA) antennas at the AP, at least one of: (i) a channel stability measurement corresponding to the AP and the STA and (ii) a delay spread measurement corresponding to the AP and the STA;
    determining, at the AP based on the channel state information comprising at least one of the channel stability measurement and the delay spread measurement, one or more fine timing measurement (FTM) parameters; and
    transmitting, based on the one or more FTM parameters, a plurality of FTM messages between the AP and the STA, wherein the STA is configured to determine an estimated range to the AP based on the plurality of FTM messages.

2. The method of claim 1, wherein the determining the channel state information comprises:
    determining the channel stability measurement corresponding to the AP and the STA, using the plurality of AoA antennas; and
    determining the delay spread measurement corresponding to the AP and the STA, using the plurality of the AoA antennas.

3. The method of claim 2, wherein the determining, at the AP based on the channel state information, the one or more FTM parameters comprises:
    determining a burst period for the plurality of FTM messages based on the channel stability measurement; and
    determining a burst size for the plurality of FTM messages based on the delay spread measurement, wherein the transmitting the plurality of FTM messages between the AP and the STA is based on the burst period and the burst size.

4. The method of claim 1, further comprising:
    determining, at the AP after transmission of a first FTM message of the plurality of FTM messages, revised channel state information corresponding to the STA; and
    determining, at the AP based on the revised channel state information, a second one or more FTM parameters, wherein transmission of at least one FTM message of the plurality of FTM messages is based on the second one or more FTM parameters.

5. The method of claim 1, further comprising:
    determining that transmission between the AP and STA comprises multiple paths, wherein the STA is configured to determine the estimated range to the AP based on the determined multiple paths.

6. The method of claim 5, wherein the determining the estimated range to the AP based on the determined multiple paths comprises:
    estimating a reflection pattern between the AP and STA;
    identifying a plurality of timestamps related to transmitting the plurality of FTM messages between the AP and the STA;
    calculating one or more coefficients relating to the plurality of timestamps based on the reflection pattern; and
    determining the estimated range to the AP based on the plurality of timestamps and the one or more coefficients.

7. The method of claim 1, further comprising:
    receiving a first FTM message; and
    discarding the first FTM message, based on the determined channel state information.

8. The method of claim 7, wherein the determining the estimated range is not based on the discarded first FTM message.

9. The method of claim 1, wherein the determining, at the AP based on the channel state information, the one or more FTM parameters comprises at least one of:
    (i) determining a burst period for the plurality of FTM messages based on the channel stability measurement, and (ii) determining a burst size for the plurality of FTM messages based on the delay spread measurement, wherein the transmitting the plurality of FTM messages between the AP and the STA is based on the at least one of the burst period and the burst size.

10. A wireless access point (AP), comprising:
    a processor; and
    a memory storing a program, which, when executed on the processor, performs an operation, the operation comprising:
        determining channel state information corresponding to a wireless station (STA), comprising:
            determining, using a plurality of angle of arrival (AoA) antennas at the AP, at least one of: (i) a channel stability measurement corresponding to the AP and the STA and (ii) a delay spread measurement corresponding to the AP and the STA;
        determining, based on the channel state information comprising at least one of the channel stability measurement and the delay spread measurement, one or more fine timing measurement (FTM) parameters; and
        transmitting, based on the one or more FTM parameters, a plurality of FTM messages between the AP and the STA, wherein the STA is configured to determine an estimated range to the AP based on the plurality of FTM messages.

11. The wireless AP of claim 10, wherein the determining the channel state information comprises:
    determining the channel stability measurement corresponding to the AP and the STA, using the plurality of AoA antennas; and
    determining the delay spread measurement corresponding to the AP and the STA, using the plurality of the AoA antennas.

12. The wireless AP of claim 11, wherein the determining, based on the channel state information, the one or more FTM parameters comprises:
    determining a burst period for the plurality of FTM messages based on the channel stability measurement; and
    determining a burst size for the plurality of FTM messages based on the delay spread measurement, wherein the transmitting the plurality of FTM messages between the AP and the STA is based on the burst period and the burst size.

13. The wireless AP of claim 10, the operation further comprising:
    receiving a first FTM message; and discarding the first FTM message, based on the determined channel state information, wherein the determining the estimated range is not based on the discarded first FTM message.

14. The wireless AP of claim 10, the operation further comprising:
    determining that transmission between the AP and STA comprises multiple paths, wherein the STA is configured to determine the estimated range to the AP based on the determined multiple paths.

15. The wireless AP of claim 14, wherein the determining the estimated range to the AP based on the determined multiple paths comprises:
    estimating a reflection pattern between the AP and STA;
    identifying a plurality of timestamps related to transmitting the plurality of FTM messages between the AP and the STA;
    calculating one or more coefficients relating to the plurality of timestamps based on the reflection pattern; and
    determining the estimated range to the AP based on the plurality of timestamps and the one or more coefficients.

16. The wireless AP of claim 10, wherein the determining, at the AP based on the channel state information, the one or more FTM parameters comprises at least one of: (i) determining a burst period for the plurality of FTM messages based on the channel stability measurement, and (ii) determining a burst size for the plurality of FTM messages based on the delay spread measurement, wherein the transmitting the plurality of FTM messages between the AP and the STA is based on the at least one of the burst period and the burst size.

17. A wireless station (STA), comprising:
    a processor; and
    a memory storing a program, which, when executed on the processor, performs an operation, the operation comprising:
        receiving one or more fine timing measurement (FTM) parameters from a wireless access point (AP), wherein the AP is configured to determine the one or more FTM parameters based on channel state information corresponding to the STA, and wherein the AP is configured to determine the channel state information based on determining, using a plurality of angle of arrival (AoA) antennas at the AP, at least one of: (i) a channel stability measurement corresponding to the AP and the STA and (ii) a delay spread measurement corresponding to the AP and the STA;
        transmitting, based on the one or more FTM parameters, a plurality of FTM messages between the STA and the AP; and
        determining an estimated range to the AP based on the plurality of FTM messages.

18. The wireless STA of claim 17, wherein the AP is configured to determine the channel state information based on: determining the channel stability measurement corresponding to the AP and the STA, using the plurality of AoA antennas, and determining the delay spread measurement corresponding to the AP and the STA, using the plurality of AoA antennas, and wherein the AP is configured to determine the one or more FTM parameters based on:
    determining a burst period for the plurality of FTM messages based on the channel stability measurement; and
    determining a burst size for the plurality of FTM messages based on the delay spread measurement, wherein the transmitting the plurality of FTM messages between the AP and the STA is based on the burst period and the burst size.

19. The wireless STA of claim 17, further comprising:
    determining that transmission between the AP and STA comprises multiple paths; and
    determining the estimated range to the AP based on the determined multiple paths.

20. The wireless STA of claim 17, wherein the determining the one or more FTM parameters based on channel state information corresponding to the STA comprises at least one of: (i) determining a burst period for the plurality of FTM messages based on the channel stability measurement, and (ii) determining a burst size for the plurality of FTM messages based on the delay spread measurement, wherein the transmitting the plurality of FTM messages between the AP and the STA is based on the at least one of the burst period and the burst size.

* * * * *